Figure 1:
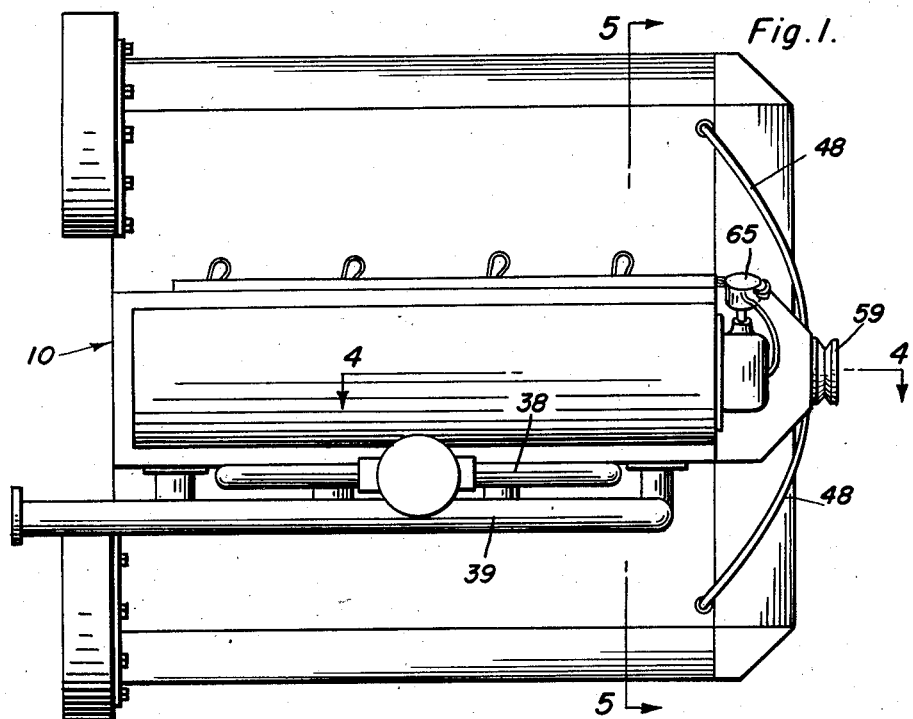

Aug. 17, 1948.   N. RAKOS   2,447,277
INTERNAL-COMBUSTION ENGINE AND
LUBRICATING SYSTEM THEREFOR
Filed June 26, 1947   6 Sheets-Sheet 1

Inventor
Nicholas Rakos

By *Clarence A. O'Brien and Harvey B. Jacobson*
Attorneys

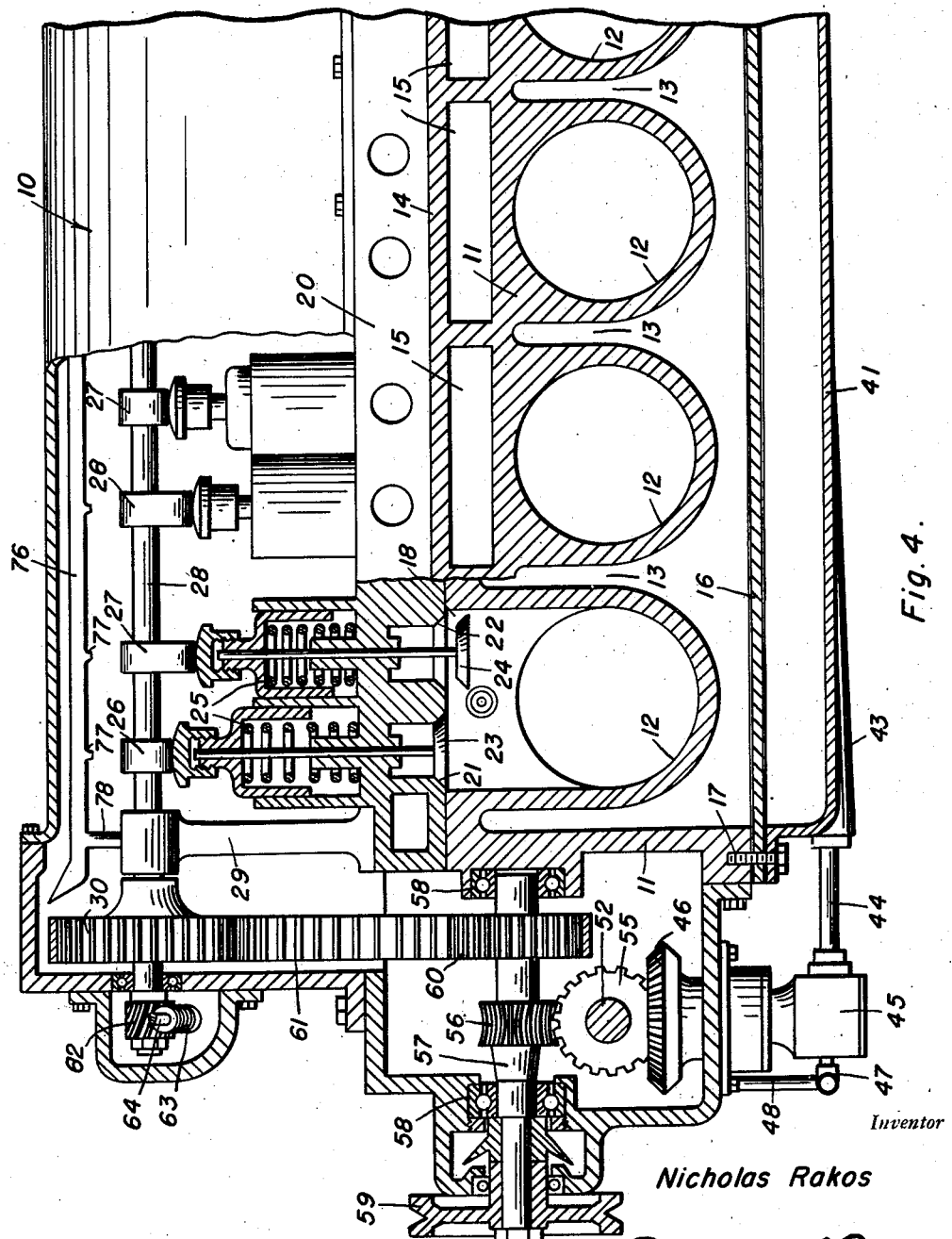

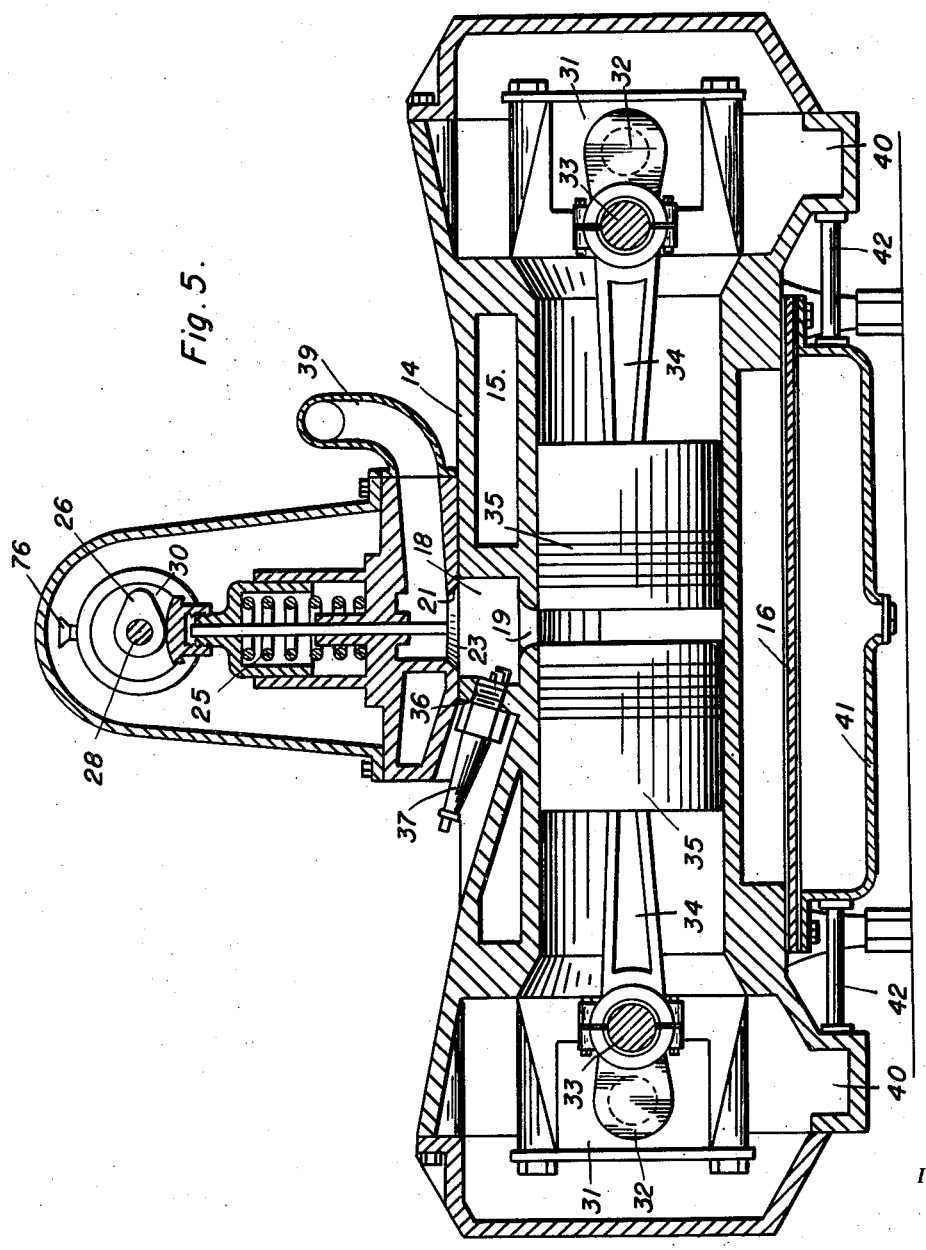

Aug. 17, 1948.
N. RAKOS
2,447,277
INTERNAL-COMBUSTION ENGINE AND
LUBRICATING SYSTEM THEREFOR
Filed June 26, 1947
6 Sheets-Sheet 5
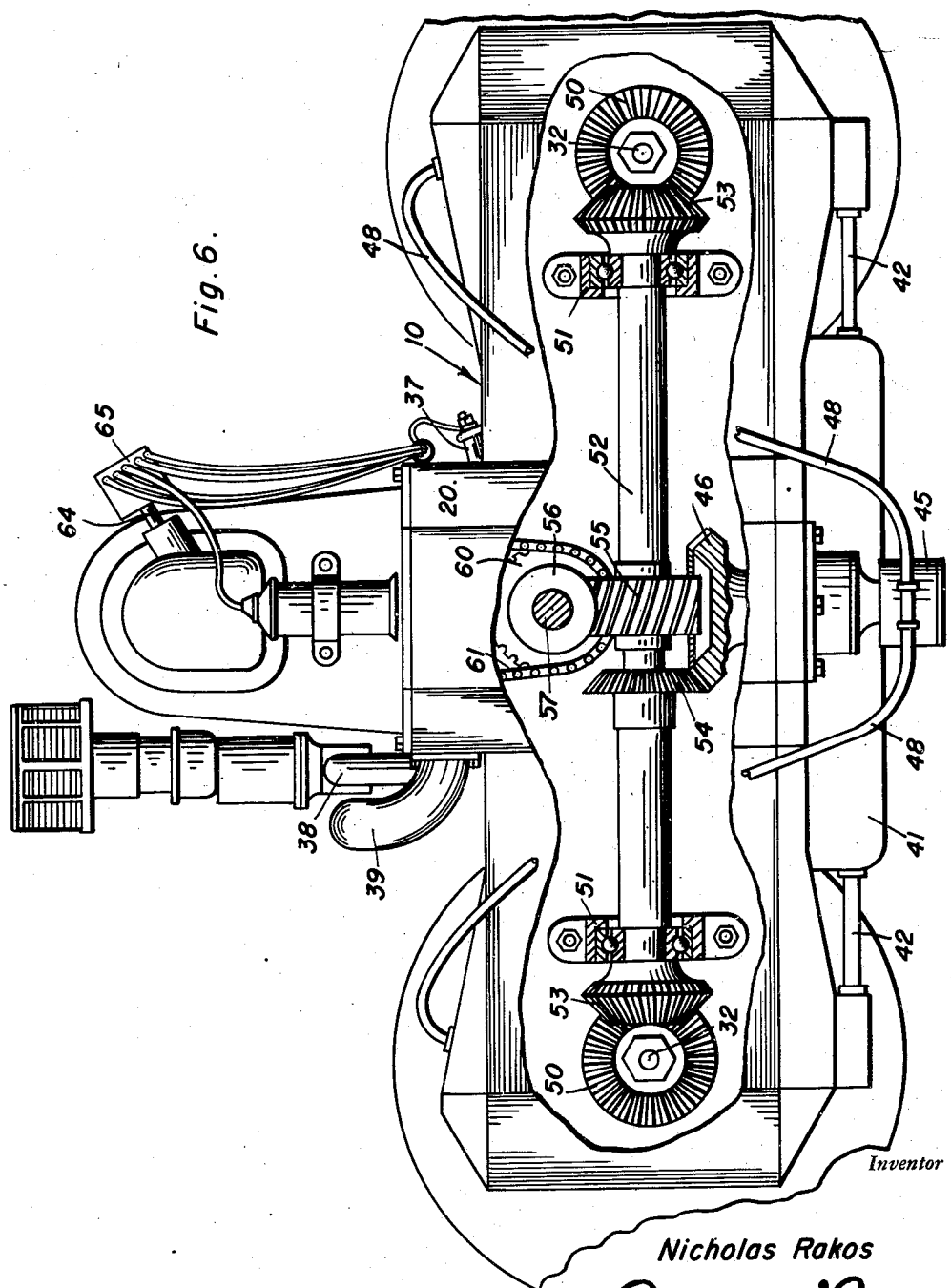
Inventor
Nicholas Rakos
By
Attorneys

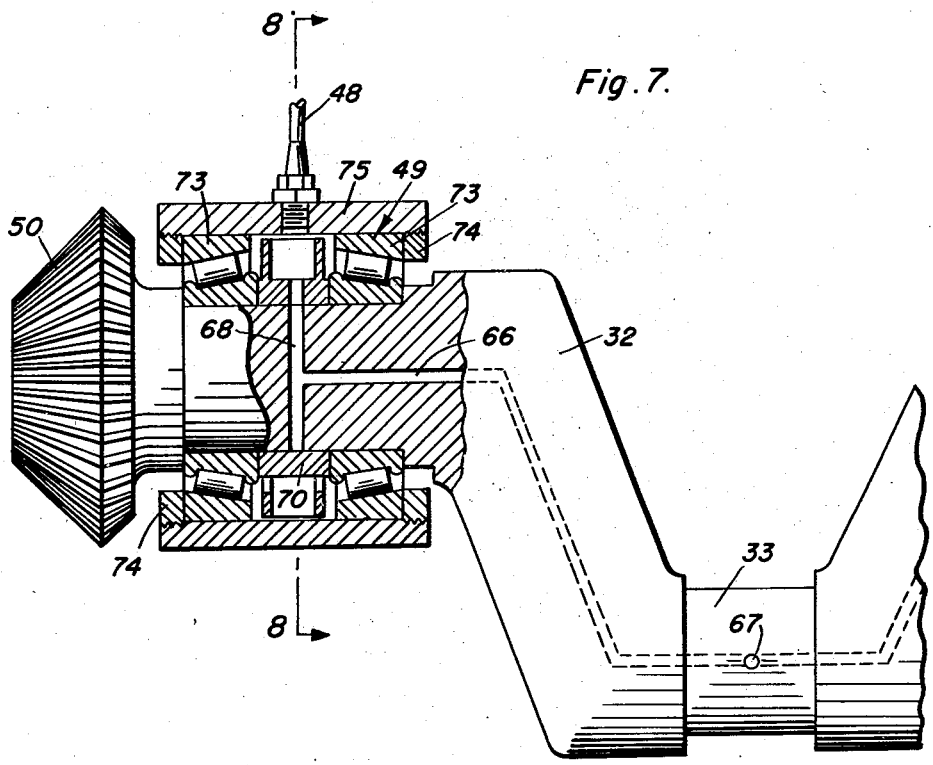
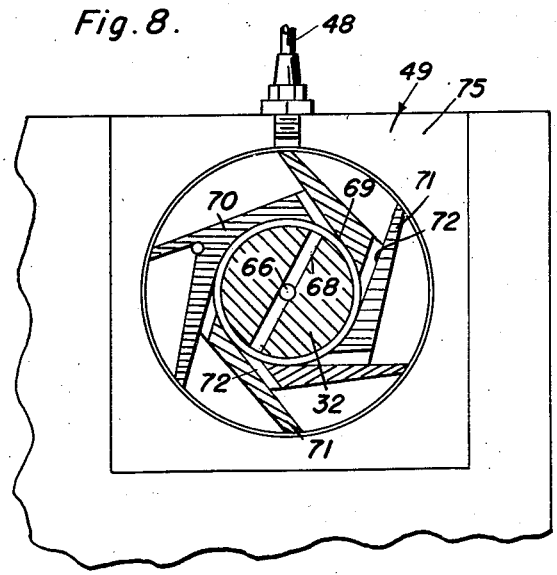

Patented Aug. 17, 1948

2,447,277

UNITED STATES PATENT OFFICE 2,447,277

INTERNAL-COMBUSTION ENGINE AND LUBRICATING SYSTEM THEREFOR

Nicholas Rakos, Cleveland, Ohio

Application June 26, 1947, Serial No. 757,251

4 Claims. (Cl. 123—51)

1

This invention relates to an internal combustion engine and a lubricating system therefor and has for its primary object to provide adequate lubrication for the operating parts of an engine of the type having opposed pistons operating in each individual cylinder.

Another object is to simplify the operation of the timing of the engine, and the driving of the lubricating pump thereof.

The above and other objects may be attained by employing this invention which embodies among its features a cylinder, a crank shaft mounted to rotate adjacent each end of the cylinder, a piston connected to each crank shaft and movable longitudinally in the cylinder, means to admit and fire a combustible mixture in the cylinder between the pistons, and exhaust ports in the cylinder between the pistons through which spent gasses are expelled, a common drive shaft interconnecting the crank shafts, timing means driven by the common drive shaft to govern the intake and firing of the combustible mixture and the opening of the exhaust port, and an engine lubricating pump driven by the common drive shaft.

Other features include an oil reservoir beneath the cylinder into which lubricating oil from the engine is collected and an oil pump coupled to the reservoir and driven by the common drive shaft for pumping oil from the reservoir for lubricating the engine.

Still other features include a longitudinal bore extending through each crank shaft throughout its entire length, transverse bores extending through the crank shafts and communicating with the longitudinal bore for feeding lubricant to the crank bearings and anti-friction main bearings for the crank shafts through which the lubricant is fed from the pump to the longitudinal bore of each crank shaft.

Figure 2:
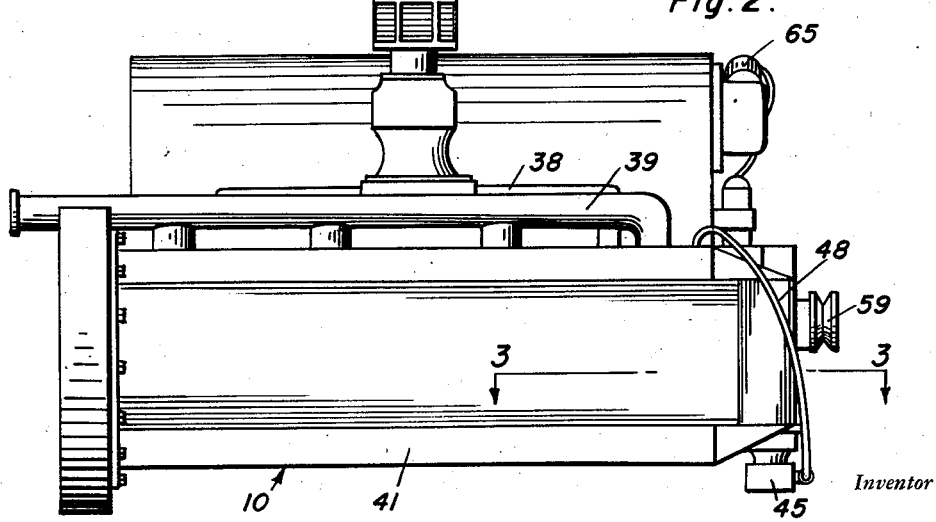
Figure 3:
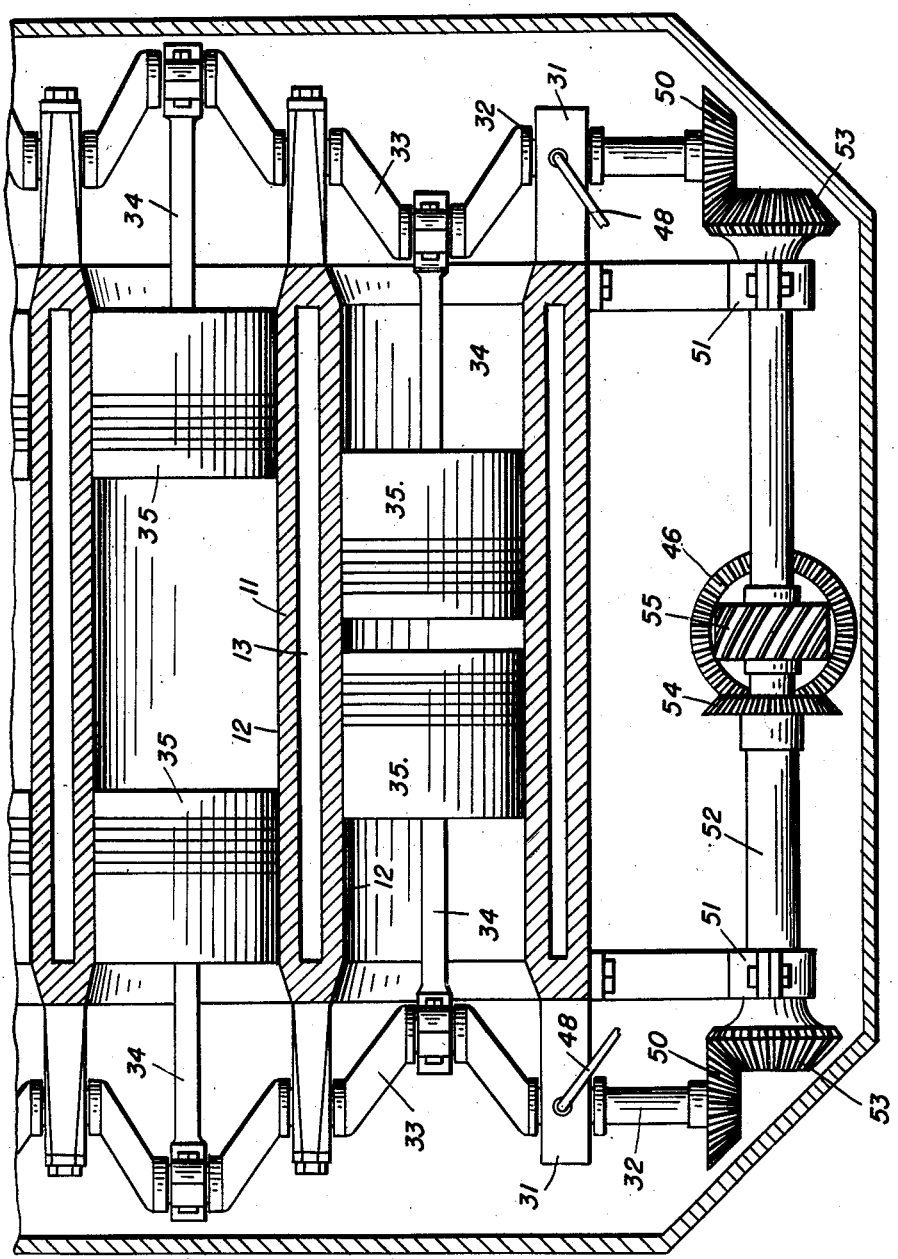

In the drawings:

Figure 1 is a top plan view of an internal combustion engine embodying the features of this invention, Figure 2 is a side view of the engine illustrated in Figure 1, Figure 3 is a horizontal sectional view taken substantially along the line 3—3 of Figure 2, Figure 4 is a longitudinal sectional view taken substantially along the line 4—4 of Figure 1, Figure 5 is a transverse sectional view taken substantially along the line 5—5 of Figure 1, Figure 6 is an end view of the engine showing a portion of the casing broken away more clearly to illustrate certain details of construction,

2

Figure 7 is a fragmentary detailed view of the crank shaft and one of the anti-friction bearings through which lubricant is fed to the crank shaft, and Figure 8 is a transverse sectional view taken substantially along the line 8—8 of Figure 7.

Referring to the drawings in detail, this improved engine comprises a cylinder block designated generally 10 which is provided with a plurality of horizontally disposed cylinders 11 each having a longitudinal bore 12 which opens through opposite ends of its respective cylinder. The cylinders are arranged in a single block with spaces 13 between them through which cooling fluid is circulated from a surrounding water jacket 14 forming spaces 15 through which the cooling fluid passes. The casing or cylinder block 11 is provided with side and end walls which extends downwardly to a common plane, and the lower end of the water jacket thus formed is closed by a bottom plate 16 which is attached to the side and end walls by suitable cap screws 17. Formed above each cylinder is a compression chamber 18 which communicates through a passage 19 with the cylinder midway between opposite ends. Each compression chamber 18 is closed at its upper open side by a cylinder head 20 having opening into each respective compression chamber 18 an exhaust port 21 and an intake port 22 which are adapted to be closed respectively by an exhaust valve 23 and an intake valve 24. These valves are urged to closed position under the influence of compression coil springs 25 and are adapted to be moved into open position by means of cams 26 and 27 respectively carried by the cam shaft 28.

The cam shaft 28 is mounted in suitable bearing brackets 29 mounted on the upper side of the cylinder head 20 adjacent opposite ends. Connected to the forward ends of the cam shaft 28 is a drive sprocket 30 which is adapted to be driven in a manner to be more fully hereinafter described in proper timed relation with the crank shafts of the engine.

Mounted in suitable bearing blocks 31 carried by the casing of the engine adjacent opposite ends of the cylinders 11 are crank shafts 32 to the cranks 33 of which are coupled connecting rods 34 which extend toward one another within each cylinder and are coupled at their inner ends through conventional wrist pins to pistons 35 mounted for longitudinal sliding movement in the respective cylinder 11. As illustrated in Figure 3, the cranks 33 of the crank shafts 32 are arranged so that the pistons 35 in each cylinder 11 move toward and away from one another in unison. It will thus be seen that when a charge is fired within the cylinder between the pistons 35 they will both be driven in opposite directions away from one another and then during the scavenging stroke they will be driven by the crank shafts 32 toward one another in a conventional manner. In its preferred form, the engine is of the multi-cylinder type so that when pistons of one cylinder are advanced toward one another to their fullest extent, those of an adjacent cylinder will be separated to their full extent.

Formed in the cylinder head and opening into each compression chamber 18 is an internally screw-threaded opening 36 through which a conventional spark plug 37 is introduced to fire a compressed charge within its respective compression chamber 18. A suitable intake manifold 38 is arranged to communicate with each intake port 22, and a suitable exhaust manifold 39 communicates with each exhaust port 21.

The case of each crank shaft 32 is equipped at its bottom with sump 40 in which the lubricating oil used in the engine is collected. A pan 41 is attached to the underside of the engine by the cap screws 17 previously described, and communication is established between the sumps 40 and the pan 41 by means of the tubular conduit 42. It will thus be seen that the lubricant finding its way into the sumps 40 will flow into the pan 41, thus forming a reservoir of lubricant from which the lubricant is pumped through the engine as will be more fully hereinafter explained. As illustrated in Figure 4, the bottom wall of the pan 41 is provided with a longitudinal depression 43 which slopes downwardly toward the forward end of the engine and coupled into the forward end of the depression portion 42 of the pan 41 is a tubular conduit 44 which in turn is connected to the intake side of a suitable oil pump 45 the drive shaft of which extends upwardly through the forward end of the engine casing and is equipped with a bevel drive gear 46. The outlet side of the pump 45 is coupled through the medium of a suitable fitting 47 to oil distributing pipes 48 which lead upwardly over the exterior of the engine casing and into the anti-friction bearings designated generally 49 (Fig. 7) which support the forward ends of the crank shafts 32.

The forward end of each crank shaft 32 is provided with a bevel pinion 50, and mounted in suitable bearings 51 carried at the forward ends of the engine adjacent each side is a common drive shaft 52. Fixed to each end of the drive shaft 52 is a bevel pinion 53 which meshes with the bevel pinion 50 on its respective side of the engine so that as either of the crank shafts 32 is rotated, the other will be driven in unison therewith. Fixed to the common drive shaft 52 intermediate its ends is a bevel drive pinion 54 which meshes with the bevel drive gear 46 of the pump 45. It will thus be seen that when either of the crank shafts 32 is rotated, the pump will be driven, it being understood that the direction of movement of the pinion 54 is such as to cause the pinion 46 to rotate in a direction to force fluid through the pump from the conduit 44 into the fitting 47.

Fixed to the shaft 52 intermediate its ends and adjacent the bevel pinion 54 is a worm 55 which has meshing engagement with a worm gear 56 carried by a shaft 57 which is mounted to rotate in suitable anti-friction bearings 58 carried by the engine casing about a horizontal axis which lies longitudinally of the engine substantially midway between the axes of opposite crank shafts 32. Fixed to the shaft 57 adjacent its outer end is a pulley 59 having a V-groove therein in which the fan belt of the engine is retained. Secured to the shaft 57 adjacent its inner end is a sprocket 60 which has driving connection with the sprocket 30 of cam shaft 28 through the medium of an endless sprocket chain 61. It will thus be seen that the rotation of the crank shafts 32 will cause the sprocket 60 to be driven in proper timed relation through the medium of the worm and worm gear, and hence the cam shaft 28 positively will be driven in proper timed relation to open and close the intake and exhaust valves 24 and 23.

Fixed to the outer end of the cam shaft 28 is a worm 62 which meshes with a worm gear 63 carried by the shaft 64 of a conventional distributor 65 which is coupled in a conventional manner with the spark plugs previously mentioned.

In order properly to distribute the lubricant pumped by the pump 45 through the pipes 48 to the main bearings 49, through the other part of the engine, each crank shaft 32 is provided with a longitudinal bore 66, and each crank 33 is provided with a transverse bore 67 which extends therethrough and communicates with the longitudinal bore 66 extending therethrough. Formed in the crank shaft 32 between opposite ends of the bearing 49 is a transverse bore 68 which extends through the crank shaft and communicates with the longitudinal bore 66 as will be readily understood upon reference to Figures 7 and 8. Aligning with opposite ends of the transverse bore 68 is an annular groove 69 formed in the periphery of the crank shaft, and fitted over the crank shaft and enclosing the groove 69 is a paddle wheel 70 carrying a plurality of outwardly extending paddles 71, the base of each of which is formed with an opening 72 which communicates with the groove 69 previously referred to. Mounted on opposite sides of the paddle wheels 70 are anti-friction roller bearings 73 which are held in place by externally screw-threaded rings 74 in a housing 75 into which the respective pipes 48 lead. The discharge end of each pipe 48 is disposed to discharge the fluid passing therethrough into its respective paddle wheel 70, so that the fluid under pressure from the pump 45 will be picked up by the paddles 71 and forced through the openings 72 into the groove 69 from whence it is forced through the transverse bores 68 into the longitudinal bores 66, to be distributed through the transverse bores 67 into the crank bearings of the connecting rods 34. It will thus be seen that the connecting rod bearings will be thoroughly lubricated through the crank shafts.

In order effectively to lubricate the cam shaft 28, the cams 26 and 27 and their respective valve operating mechanisms, a trough 76 is supported above the cam shafts 28 in parallel relation therewith and this trough is provided with downwardly directed jets 77, each of which is directed downwardly toward a cam on the cam shaft. The trough 76 is coupled to the discharge side of the pump 45 through the medium of a conduit 78 so that as the pump is operated the lubricant will be distributed into the trough 76 and thence over the cams and cam shaft 28, effectively to lubricate the valve actuating mechanism. Any excess lubricant will find its way by gravity downwardly through the casing and into the pan 41 so as to preserve a reservoir of lubricant in the pan which is constantly circulated by the pump 45 through the lubricating system.

In operation, it will be understood that the engine functions in a conventional manner in that the charge of combustible mixture is admitted to the intake manifold 38 and intake valve 40 into the compression chamber 18 so that as the pistons approach one another the charge admitted to the cylinder will be compressed. Upon reaching its compressed state, the charge is fired by the spark plug 37 in its respective cylinder, thus forcibly driving the pistons away from one another. The power of the expanding gases within the cylinder will thus be translated into useful energy through the connecting rods 34 and cranks 33 of the crank shafts 32 which will move in unison to drive the common drive shaft 52 which through the medium of the pinion 54 and gear 46 drives the pump 45 to force the lubricant through the pipes 43 and 78 through the lubricating system of the engine. Simultaneously, the shaft 57 will be driven by the worm 55 and worm gear 56 in proper timed relation to cause the sprocket 60 to drive the chain 61 and through the medium of the sprocket 30 to rotate the cam shaft 23 in proper timed relation with the movements of the pistons within the cylinders. Likewise, the worm 62 and worm gear 63 will drive the distributor 65 in order to cause the spark plugs 37 to fire their respective cylinders in proper order.

Owing to the fact that the lubricant is pumped through the crank shafts 32 under pressure it will be evident that the main bearings of the crank shaft as well as the crank bearings will be adequately lubricated under pressure, and through the medium of the sumps in the bottoms of the crank cases the excess lubricants pumped through the system will be collected and returned to the reservoir formed by the pan 41 through the pipes 42, to be re-circulated through the lubricating system.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. An internal combustion engine which includes a cylinder, a crank shaft mounted to rotate adjacent each end of the cyilnder, a piston connected to each crank shaft and movable longitudinally in the cylinder, means to admit and fire a combustible mixture in the cylinder between the pistons, an exhaust port in the cylinder between the pistons through which spent gases are expelled, a common drive shaft interconnecting the crank shafts, timing means driven by the common drive shaft to govern the intake and firing of the combustible mixture and the opening of the exhaust port and an engine lubricating pump driven by the common drive shaft.

2. An internal combustion engine which includes a cylinder, a crank shaft mounted to rotate adjacent each end of the cylinder, a piston connected to each crank shaft and movable longitudinally in the cylinder, means to admit and fire a combustible mixture in the cylinder between the pistons, an exhaust port in the cylinder between the pistons through which spent gases are expelled, a common drive shaft interconnecting the crank shafts, timing means driven by the common drive shaft to govern the intake and firing of the combustible mixture and the opening of the exhaust port, and an engine lubricating pump driven by the common drive shaft, an oil reservoir beneath the cylinder into which lubricating oil from the engine is collected and an oil pump coupled to the reservoir and driven by the common drive shaft for pumping oil from the reservoir and for lubricating the engine.

3. An internal combustion engine which includes a cylinder, a crank shaft mounted to rotate adjacent each end of the cylinder, a piston connected to each crank shaft and movable longitudinally in the cylinder, means to admit and fire a combustible mixture in the cylinder between the pistons, an exhaust port in the cylinder between the pistons through which spent gases are expelled, a common drive shaft interconnecting the crank shafts, timing means driven by the common drive shaft to govern the intake and firing of the combustible mixture and the opening of the exhaust port, each crank shaft having a bore extending throughout its entire length, an oil reservoir beneath the cylinder in which lubricating oil used to lubricate the engine is collected, a pump driven by the common drive shaft and coupled to the reservoir and pipes from the pump through which oil discharged thereby is conducted to the bores in the crank shafts.

4. An internal combustion engine which includes a cylinder, a crank shaft adjacent each end of the cylinder, the crank shaft being mounted to rotate about parallel axes which lie perpendicular to and intersect the longitudinal axis of the cylinder, means to admit a combustible mixture into the cylinder between the pistons, means to fire said mixture, an exhaust port in the cylinder between the pistons through which spent gases are expelled, a common drive shaft lying parallel with the cylinder and interconnecting the crank shafts, a cam shaft above the cylinder, said cam shaft lying along an axis which lies midway between the ends of the cylinder and parallel to the axes of the crank shafts and means establishing driving connection between the common drive shaft and the cam shaft, each crank shaft having a bore extending throughout its entire length, an oil reservoir beneath the cylinder in which lubricating oil used to lubricate the engine is collected, a pump driven by the common drive shaft and coupled to the reservoir and pipes leading from the pump through which oil discharged thereby is conducted to the bores in the crank shafts.

NICHOLAS RAKOS.

REFERENCES CITED

The following references are of record in the file of this patent:

UNITED STATES PATENTS

| Number | Name | Date |
| --- | --- | --- |
| 1,037,667 | Schaffer | Sept. 3, 1912 |
| 1,948,340 | Dolza et al. | Feb. 20, 1934 |
| 2,361,700 | Mathis | Oct. 31, 1944 |
| 2,390,960 | Raybon | Dec. 11, 1945 |